(12) United States Patent
Barsness et al.

(10) Patent No.: US 8,055,651 B2
(45) Date of Patent: Nov. 8, 2011

(54) DISTRIBUTION OF JOIN OPERATIONS ON A MULTI-NODE COMPUTER SYSTEM

(75) Inventors: Eric Lawrence Barsness, Pine Island, MN (US); Amanda Peters, Cambridge, MA (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/368,505

(22) Filed: Feb. 10, 2009

(65) Prior Publication Data

US 2010/0205170 A1    Aug. 12, 2010

(51) Int. Cl.
*G06F 17/30* (2006.01)
(52) U.S. Cl. ........................................ 707/714; 707/705
(58) Field of Classification Search .................. 707/705, 707/714, 957, 999.002
See application file for complete search history.

(56) References Cited

U.S. PATENT DOCUMENTS

| 5,649,112 | A  | * | 7/1997 | Yeager et al. | 709/220 |
| 5,752,017 | A  | * | 5/1998 | Bhargava et al. | 1/1 |
| 5,806,059 | A  | * | 9/1998 | Tsuchida et al. | 1/1 |
| 6,256,621 | B1 | * | 7/2001 | Tsuchida et al. | 1/1 |
| 7,941,424 | B2 | * | 5/2011 | Xu et al. | 707/714 |
| 2007/0033159 | A1 | * | 2/2007 | Cherkauer | 707/2 |

* cited by examiner

*Primary Examiner* — Cheryl Lewis
(74) *Attorney, Agent, or Firm* — Martin & Associates, LLC; Bret J. Petersen

(57) ABSTRACT

A method and apparatus distributes database query joins on a multi-node computing system. In the illustrated examples, a join execution unit utilizes various factors to determine where to best perform the query join. The factors include user controls in a hints record set up by a system user and properties of the system such as database configuration and system resources. The user controls in the hints record include a location flag and a determinicity flag. The properties of the system include the free space on the node and the size join, the data traffic on the networks and the data traffic generated by the join, the time to execute the join and nodes that already have code optimization. The join execution unit also determines whether to use collector nodes to optimize the query join.

20 Claims, 8 Drawing Sheets

Data A

| Employee ID 812 | Name 814 | Address 816 | |
|---|---|---|---|
| 1 | John Santos | 1402 30th street nw rochester NY 55905 | 810A |
| 2 | Paul Bungus | 13402 28th street nw rochester NY 55905 | |
| 3 | Michele Beuman | 144 30th street nw Rochester NY 55905 | |
| n | Amanda Peters | 146 10th street Rochester NY 55905 | 810N |

Data B

| Employee ID 912 | Salary 914 | Pay Increase 916 |
|---|---|---|
| 1 | 200,000 | 5% |
| 2 | 125,000 | 5% |
| 3 | 88,000 | 5% |
| n | 180,000 | 5% |

DISTRIBUTION OF JOIN OPERATIONS ON A MULTI-NODE COMPUTER SYSTEM

BACKGROUND

1. Technical Field

The disclosure and claims herein generally relate to multi-node computer systems, and more specifically relate to distribution of join operations on a multi-node computer system to optimize the efficiency of the system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree. The nodes are also connected with a three-dimensional torus network.

Multi-node computer systems with nodes that each have a processor and memory allow the system to provide an in memory database. For an in memory database, portions of the database, or the entire database resides completely in memory. An in memory database provides an extremely fast response time for searches or queries of the database. However, an in memory database poses new challenges for computer database administrators to determine where to load computing processes to efficiently take full advantage of the in memory database. A query of an in memory database in a multi-nodal environment will often involve many nodes. Having the data split apart on many nodes complicates where to execute a join operation.

Without a way to effectively determine where to execute query joins, multi-node, parallel computer systems will not be able to fully utilize the potential power of an in memory database.

BRIEF SUMMARY

The disclosure herein describes dynamic distribution of database query joins on a multi-node computing system. In the illustrated examples, a join execution unit utilizes various factors to determine where to best perform the query join. The factors include user controls in a hints record set up by a system user and properties of the system such as database configuration and system resources. The user controls in the hints record include a location flag and a determinicity flag. The properties of the system include the free space on the node and the size join, the data traffic on the networks and the data traffic generated by the join, the time to execute the join and nodes that already have code optimization. The join execution unit also determines whether to use collector nodes to optimize the query join.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to dynamic distribution of database query join operations on a multi-node computing system. The examples herein will be described with respect to the Blue Gene/L massively parallel computer developed by International Business Machines Corporation (IBM).

Figure 1:
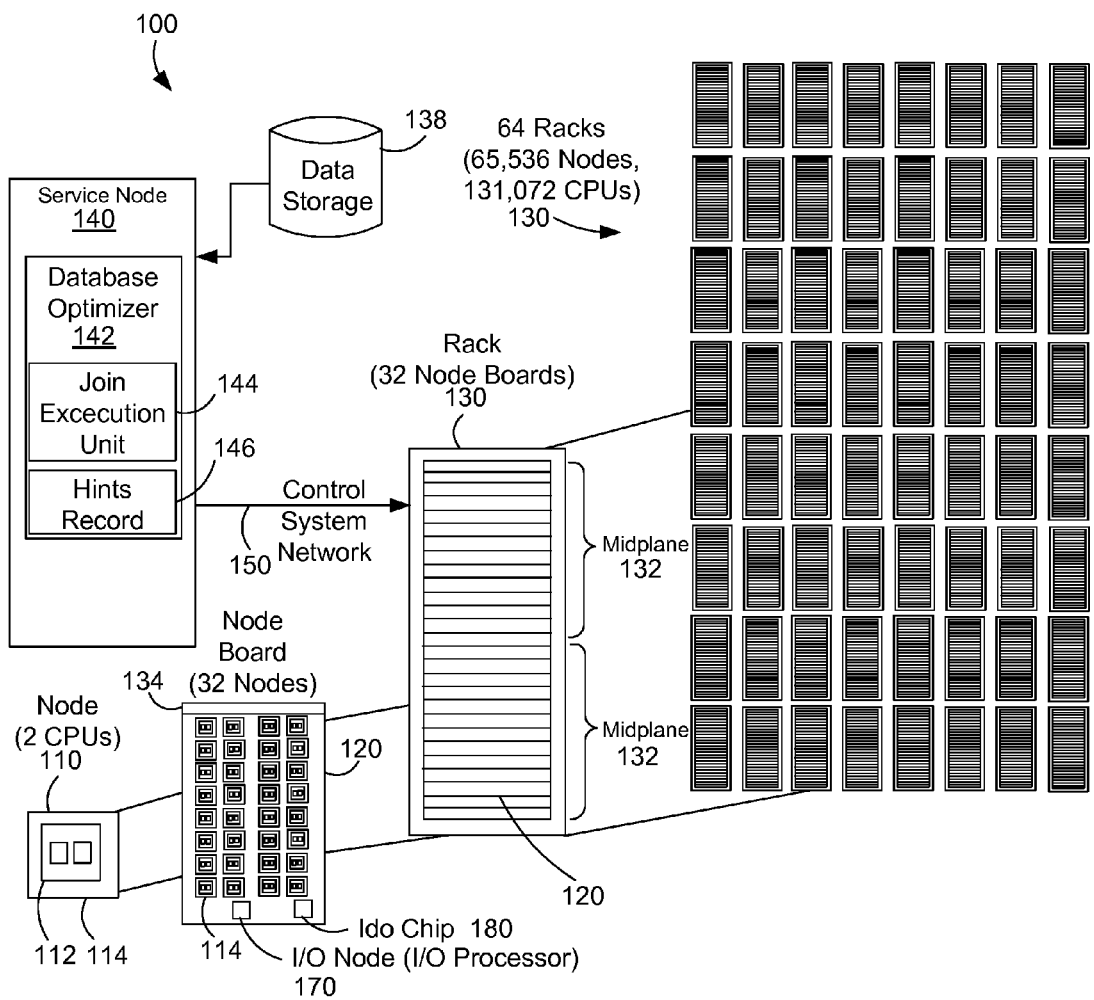
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node 170 that has an I/O processor connected to the service node 140. The I/O nodes 170 have no local storage. The I/O nodes are connected to the compute nodes through the logical tree network and also have functional wide area network capabilities through a gigabit Ethernet network (See FIG. 2 below). The gigabit Ethernet network is connected to an I/O processor (or Blue Gene/L link chip) in the I/O node 170 located on a node board 120 that handles communication from the service node 160 to a number of nodes. A node board has slots to hold I/O cards that each has I/O nodes. The nodes on node boards can be configured in a virtual tree network that communicate with the I/O nodes.

Again referring to FIG. 1, the computer system 100 includes a service node 140 that handles the loading of the nodes with software and controls the operation of the whole system. The service node 140 is typically a mini computer system such as an IBM PSERIES server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a database optimizer 142 for optimizing, allocating and scheduling database execution and data placement on the compute nodes. The database optimizer 142 includes a join execution unit 144 that determines where to best place data and perform query joins as described further below. The join execution unit uses one or more hint records 146 that store hints and control data from the user as described further below.

Figure 2:
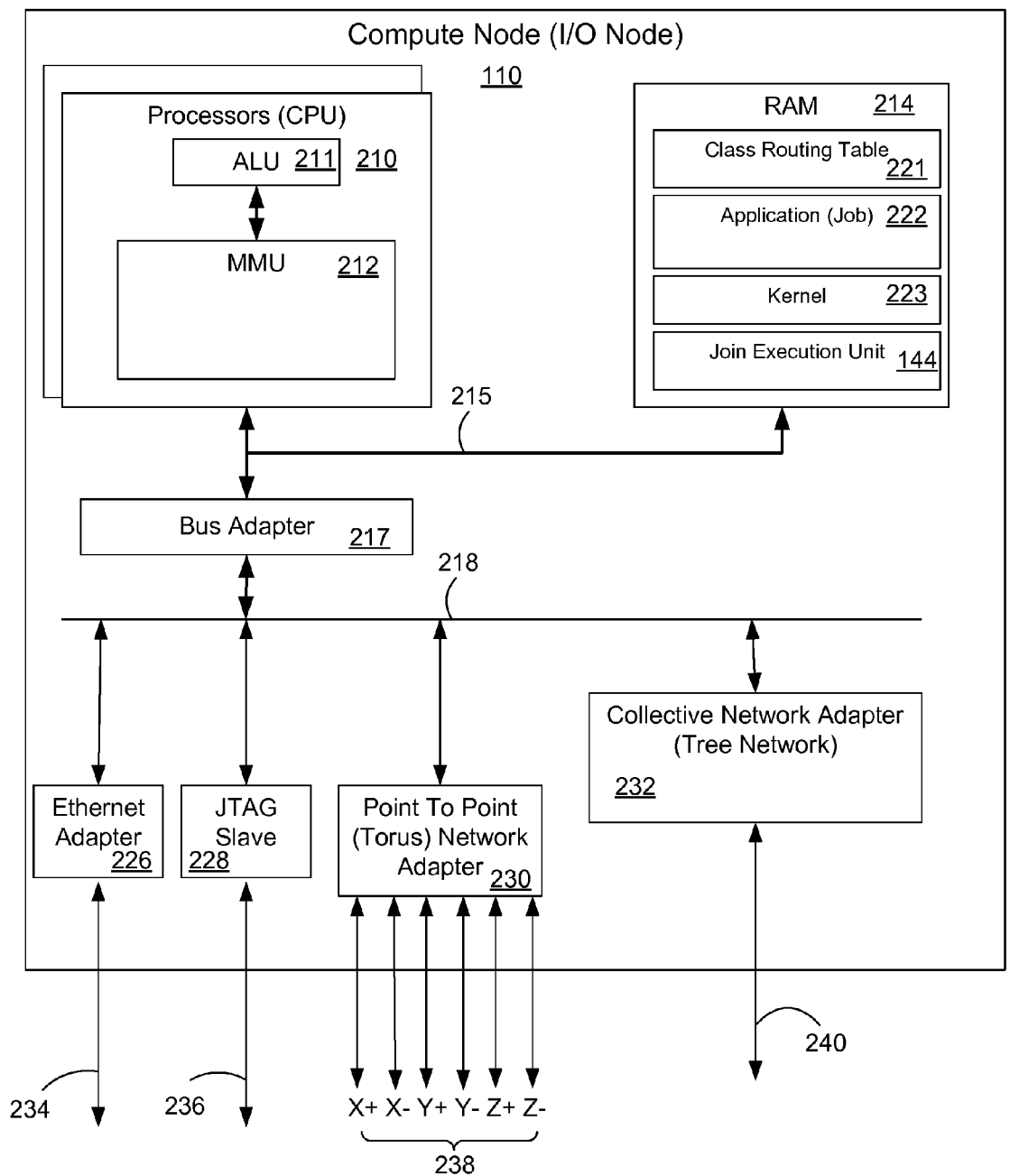
FIG. 2 is a block diagram of a compute node in a massively parallel computer system.

FIG. 2 illustrates a block diagram of an exemplary compute node 110 as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a class routing table 221, an application program (or job) 222, an operating system kernel 223 and a join execution unit 144. The class routing table 221 stores data for routing data packets on the collective network or tree network as described more fully below. The application program is loaded on the node by the control system to perform a user designated task. The application program typically runs in parallel with application programs running on adjacent nodes. The operating system kernel 223 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The join execution unit 144 is a local portion of the join execution unit 144 (shown in FIG. 1). The local portion of the join execution unit 144 may be needed to work in conjunction with the join execution unit in the service node to monitor the join process, or the entire join execution process may be done from the local join execution unit 144. Thus, the processes and operations of the join execution unit 144 described herein may be considered to be operating in either location or in both locations.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: x+, x−, y+, y−, z+, and z−. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

The collective network partitions in a manner akin to the torus network. When a user partition is formed, an independent collective network is formed for the partition; it includes all nodes in the partition (and no nodes in any other partition). In the collective network, each node contains a class routing table that is used in conjunction with a small header field in each packet of data sent over the network to determine a class. The class is used to locally determine the routing of the packet. With this technique, multiple independent collective networks are virtualized in a single physical network with one or more I/O nodes for the virtual network. Two standard examples of this are the class that connects a small group of compute nodes to an I/O node and a class that includes all the compute nodes in the system. In Blue Gene, the physical routing of the collective network is static and in the prior art the virtual network was static after being configured. As described herein, the I/O configuration mechanism (FIG. 1, 146) dynamically distributes the I/O nodes in the virtual network. Thus, while the physical routing table of the collective network is static, the virtual network can be reconfigured to dynamically redistribute the I/O nodes to the virtual networks as described herein. Alternatively, the I/O configuration mechanism could distribute the I/O nodes using hardware for a non-virtual network.

Figure 3:
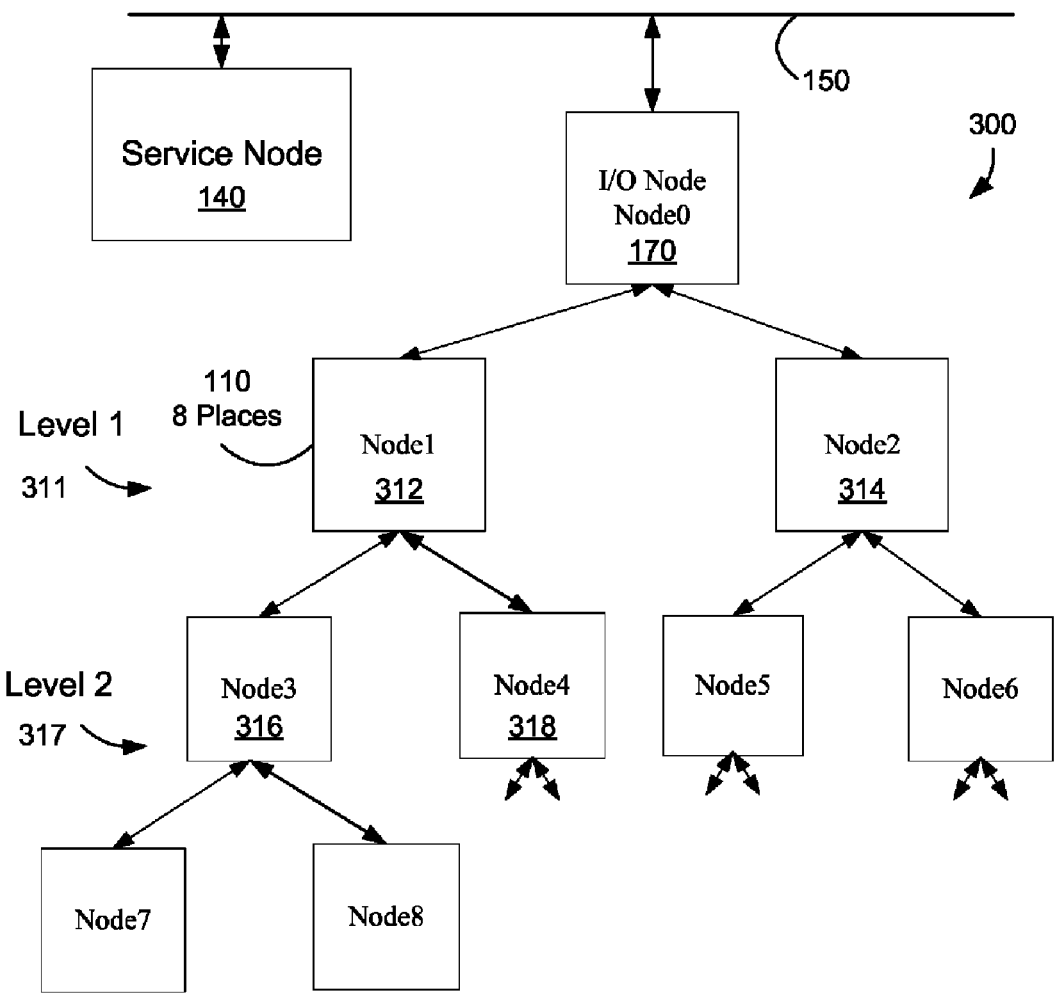
FIG. 3 shows a block diagram of a block of compute nodes to illustrate the tree network.

FIG. 3 illustrates a portion of the collective network or tree network shown as a connection 240 to the node 110 in FIG. 2. The collective or tree network 300 is connected to the service node 140 through the control system network 150. The tree network 300 is a group of compute nodes 110 connected to an I/O node designated as Node0 170 in a logical tree structure. The I/O node 170 is connected to one or more compute nodes 110. Each of the compute nodes Node1 312, and Node2 314 are connected directly to the I/O node 170 and form the top of the tree or a first level 311 for a set of nodes connected below each of Node1 312 and Node2 314. Node1 312 is the top of a tree network and has child nodes Node3 316 and Node4 318 on a second level 317. Many of the child nodes are not shown for simplicity, but the tree network 300 could contain any number of nodes with any number of levels.

Figure 4:
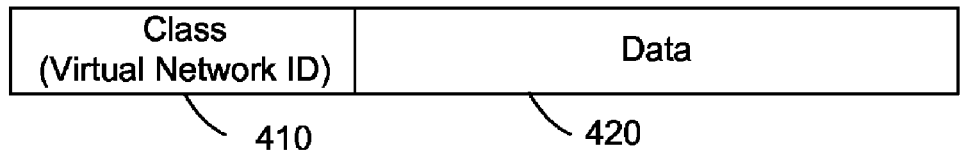
FIG. 4 shows a data packet for communicating on a collective network in a massively parallel computer system.

FIG. 4 shows a data packet 400 for communicating on the tree network 240 (FIG. 2) in a massively parallel computer system 100 (FIG. 1). Each data packet 400 includes a class 410 and data 420. The class 410 is used to determine the routing of the packet to deliver data 420 on the virtual tree network over the tree network 240. The class 410 is used in conjunction with the class routing table 221 to determine how to route the data packet 400 to the appropriate node on the tree network.

As described herein, the join execution unit 144 uses several factors to determine how to distribute join operations for efficient execution in a multi node environment. In a distributed environment there are many compute nodes that house data and also have many nodes attached to these nodes that will be used to communicate to, aggregate from, and communicate results back to the requester node. The question that will arise with any query involving a join in the select list will be where to run the join. The default answer would likely be to run the join on the node that is querying the data but this will not always be optimal. In some cases there may be free nodes that could perform this task more efficiently and certainly by off-loading the processing to these nodes the data nodes are freed up to run more queries against. The join execution unit 144 uses several factors to determine where join operations are to take place in a multi-node computer system. These factors include user controls in a hints record set up by a system user and properties of the system such as database configuration and system resources as described further below. The user controls include a location flag, a determinicity flag and optimization hints given in the form of a hints record that include hints on whether to use collector nodes for the processing. The database configuration and system properties include the free memory space available on the various relevant nodes and the size of the executable, the amount of data traffic on the networks connecting the relevant nodes, and the time to execute the process and the loading on the relevant nodes.

Figure 5:
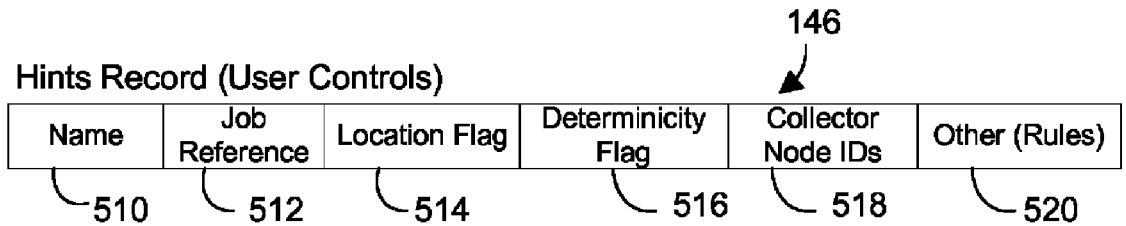
FIG. 5 shows a block diagram that represents a hints record associated with a job in a massively parallel computer system.

FIG. 5 shows a block diagram that represents user controls in a sample hints record 146 in a massively parallel computer system. The hints record 146 includes a name 510, a database job reference 512, an execution location flag 514, a determinicity flag 516, the collector node identifications (IDs) to use for the job 518 and other possible control parameters 520. The name 510 identifies the hints record. The database job reference 512 is the name of the database metadata the hints record applies to. The location flag 514 lists the nodes where the join or operation is to be executed. The determinicity flag 516 indicates that the associated data would be more efficiently processed on a collector node rather than a data node. The determinicity flag may be stored directly with the data rather than in the hints record as shown. The collector node field 518 indicates user preferences for the collector nodes to use for the join. The user preferences could identify a specific node for the collector nodes and/or the minimum and maximum number of collector nodes to use to execute the join operation. Other control parameters 520 include any other possible controls that the user can provide to govern the join operation. The other control parameters could be expressed as a rule for locating a join operation. A rule would give a condition for one of the factors and an action on how to locate the join operation. Using rules would simply allow a user to change how the join execution unit operates rather than having it coded in the software as described more fully herein.

A factor that can be used to determine where to process the join is a location flag 514 (FIG. 5) in the hints record or added to the metadata. In one suitable implementations, the location flag could take on the values of local, remote, and both. When the flag is set to local the join would run on the node where the data resides. When the flag is set to remote than the join would be executed on a remote node (i.e. a node other than where the data resides). When the flag is set for both, the database engine could decide for itself which is more appropriate. Allowing this flag to be set by the programmer or database administrator is akin to other known flags such as the one that allows the database engine to know if something is deterministic or not. When the 'both' option is enabled the database engine could determine the node to run on by making a decision that takes into account join processing time, the amount of free nodes and the backlog of incoming SQL requests along with overall data transport time and things such as determinicity.

Another user control that determines where to execute the join is the DETERMINICTY FLAG that was introduced above. The determinicity flag (516 in FIG. 5) indicates that the associated data would be more efficiently processed on a collector node rather than a data node. If a join operation is set to be deterministic and multiple nodes have a high overlap of data for a given column then it might be more advantageous to run the join on a collector node, rather than a data node. By doing the join processing on a collector node, processing on each node can be avoided and duplication of the program code on each node is also avoided.

Another user control introduced above is the collector nodes field (518 in FIG. 5) that shows the collector nodes to use and/or the minimum and maximum number of collector nodes to use to execute the join operation. To make the join run as fast as possible so other requests can execute, the join can be executed on a collector node to free up the data nodes. The database administrator could set up specific nodes to execute the join or a parameter of how many collector nodes to use.

Another factor the join execution unit can consider is the free space on the nodes and the size of the join process. If the join is extremely large in terms of space required and more importantly in terms of static storage it might consume than the join will probably be better executed on a collector node.

Another factor that would come into play in the execution of join is data traffic on the networks connecting the nodes and the amount of data traffic between the nodes generated by the join. This of course would all be taken into consideration with the amount of records being returned, i.e. the result set size. Where the join must go and retrieve data on other nodes, this may necessitate executing the join on not only the original data node and/or a collector node, but also on the node or one of the nodes that it must go and touch. This factor could involve the database optimizer and/or the join execution unit to examine the join for I/O access, or the system monitoring network traffic for historical perspective of the join accessing surrounding nodes.

Another factor may be other characteristics of the node that are not apparent in the BlueGene hardware but could easily be present in other super computing nodal environments. Other factors to consider would be processor speeds, type of processor, amount of memory, and the like. Thus, in a true distributed environment one node may not be exactly the same as other nodes in a cooperative network.

Figure 6:
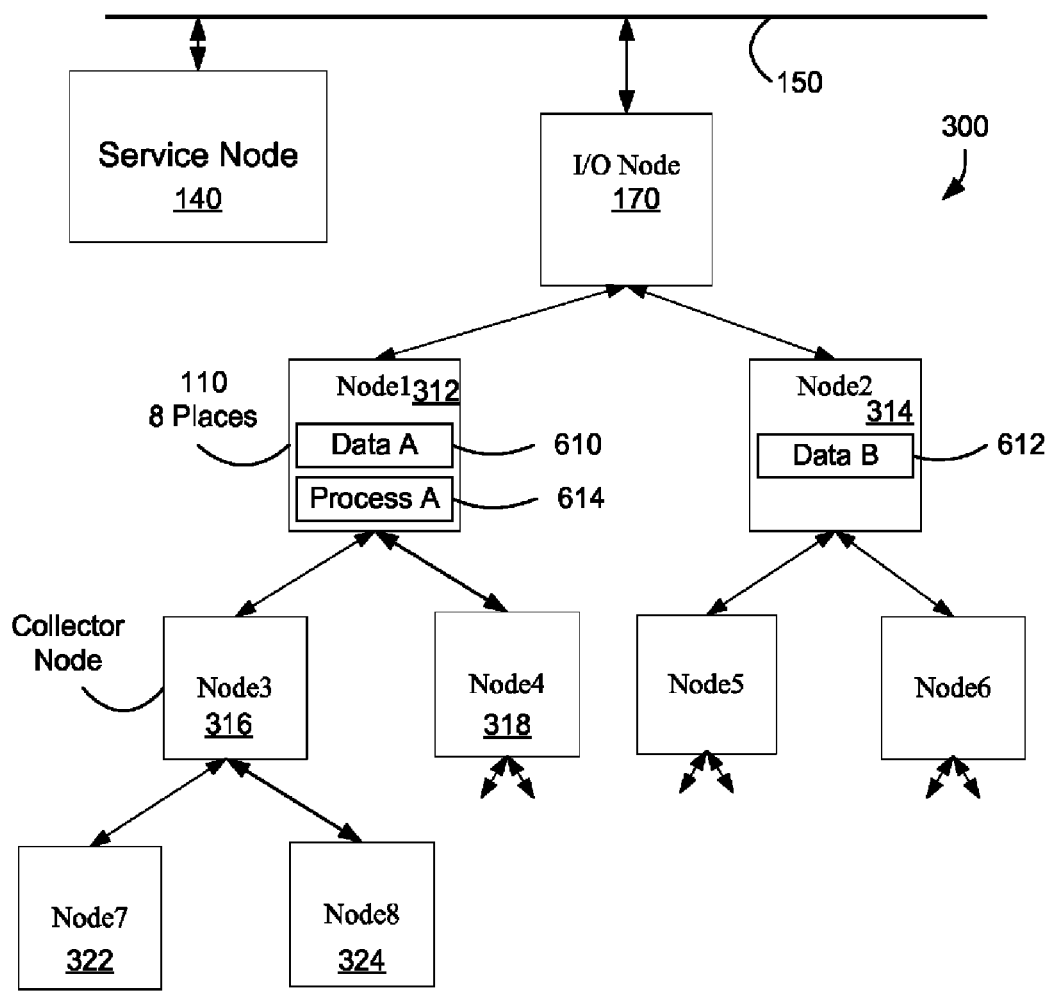
FIG. 6 is a block diagram that illustrates an example of an initial node distribution in a massively parallel computer system.
Figures 7, 8:
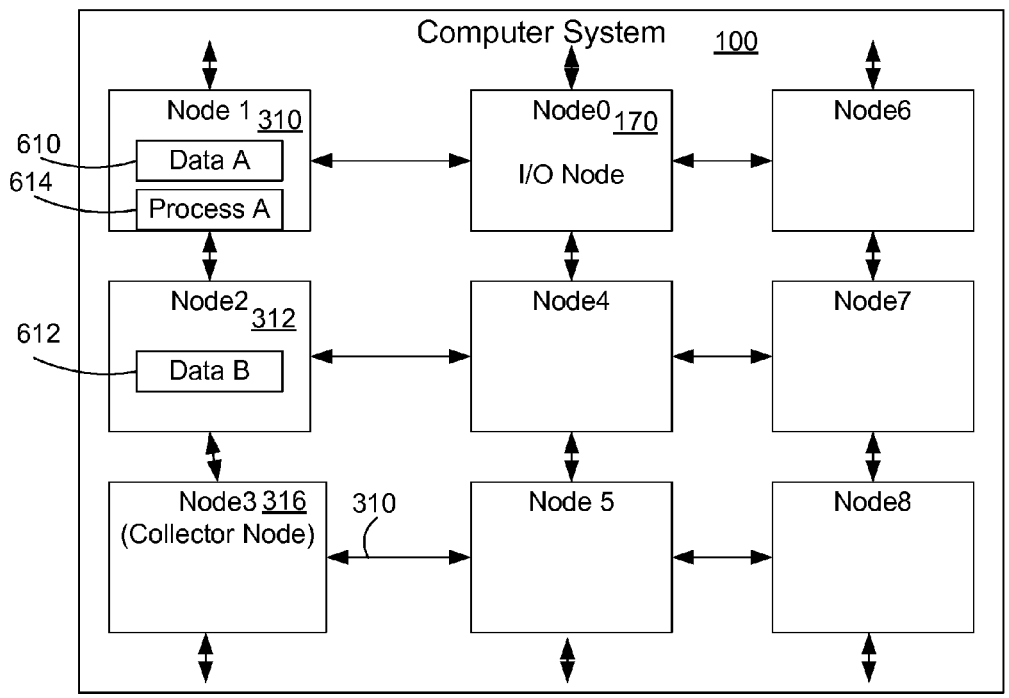
FIG. 7 is a block diagram that illustrates the same nodes shown in FIG. 6 in the torrus network in a massively parallel computer system.
FIG. 8 represents data in Data Block A used in an example herein.
Figures 9, 10:
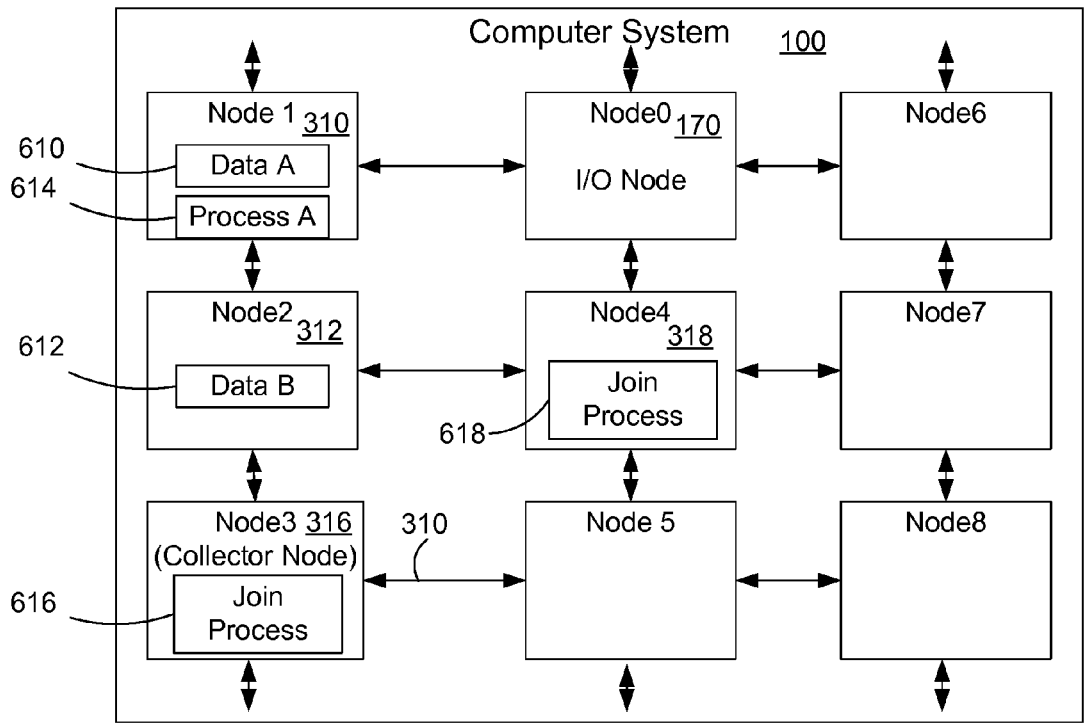
FIG. 9 represents data in Data Block B used in an example herein.
FIG. 10 is a block diagram that illustrates the same nodes shown in FIG. 8 that shows distribution of compute nodes according to an example.
Figure 11:
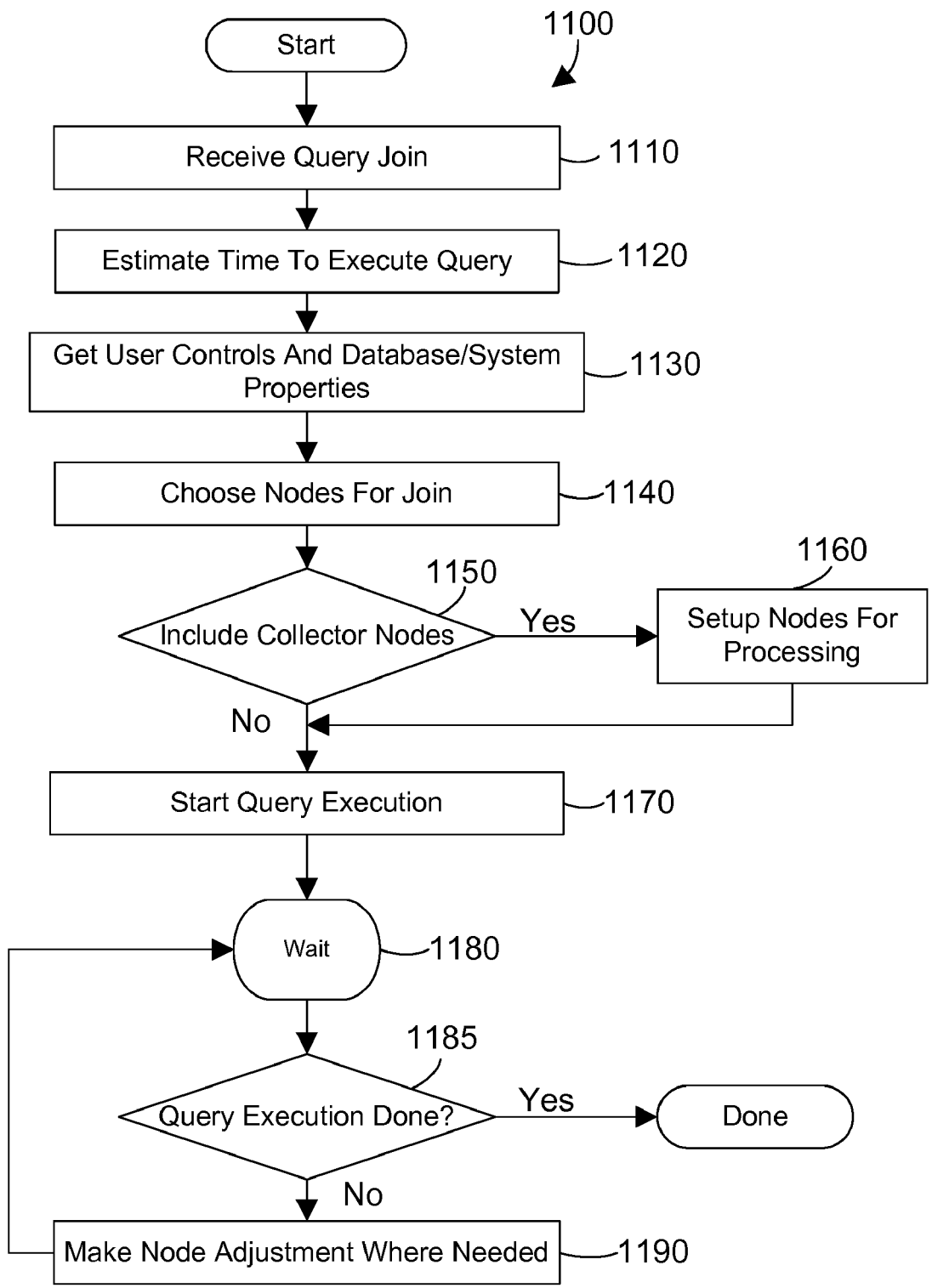
FIG. 11 is a flow diagram of a method for join process distribution on a massively parallel computer system.

Some examples of data distribution and processing will now be considered with reference to FIGS. 6 thorough 11. FIGS. 6 and 7 illustrate the relative location of data represented in FIGS. 7 and 8. FIGS. 10 and 11 then illustrate possible data distribution and processing as described further below. FIG. 6 represents the same tree network shown in FIG. 3 with the data locations for a first join example. As shown in FIG. 6, DataA 610 and DataB 612 represent two sets of database metadata that reside on a multi-node computer processor system. DataA 610 is located on Node1 312 and DataB 612 is on Node2 314. ProcessA 614 located on Node1 316 represents a join operation that operates on DataA 610 and DataB 612.

In the example shown in FIG. 6, Node3 316 has been designated as a collector node. Alternatively the I/O node 170 could serve as the collector node for the join operation. A collector node is the node that collects the data participating in the join operation and finishes the processing of the join. One or more collector nodes can participate in the join operation. It may be advantageous to have one or more of the collector nodes to be an I/O node to utilize the tree network as shown in FIG. 6.

FIG. 7 represents the same nodes shown in FIG. 6 but they now are shown connected by the torus network introduced above with reference to FIG. 2. The torus network 710 connects each node to an adjacent node on each of six sides in three dimensions (only 2 dimensions are shown in FIG. 7). As described above, DataA 610 is on Node1 312, DataB is on Node 2 314 and ProcessA 614 is also on Node1. Node3 316 is designated as the collector node. The I/O node is Node0 170.

FIG. 8 shows database tables with information for the examples herein. DataA 800 is a database table with employee information in rows 810A through 810N. DataA 800 includes columns for Employee ID 812, Name 814 and Address 816. Similarly, FIG. 9 shows database table DataB 900 that has related employee salary information in rows 910A through 910N. DataB 900 includes columns for Employee ID 912, Salary 914 and Pay Increase 916.

FIG. 10 illustrates a number of nodes for an example of distribution of database query joins. Node1 310 in FIG. 10 has a data table DataA 610 represented in FIG. 8, and Node2 312 has data table DataB 612 represented in FIG. 9. For this example, we consider the following join operation by ProcessA 614 on the data in DataA 610 and DataB 612:

SELECT name, current salary from DataA a, DataB b
Where a.id=b.id

This query operates to join the entire tables Data A 800 and Data B 900. If we first assume the tables are comparatively small, say 1000 records, then when the join execution unit 144 evaluates the size of the database and the system configuration it would determine to perform the join on the same node as the process performing the join (ProcessA). Alternatively, if we assume the tables are comparatively large, then when the join execution unit 144 evaluates the size of the database and the system configuration it would determine to perform the collection process 1010 for the join on a collector node (Node3 316).

In another example, we consider the same Figures and data as described in the previous paragraph but with any number of records. If we assume there is a hint record for this data, then the join execution unit will consider the information in the hint record to determine the location of the join operation. If we assume the hint record includes a collector node field set to Node4 318, then the join execution unit 144 would execute the join 618 on Node4 318. Alternatively, if we assume the hint record includes a determinicity flag and the collector node field does not specify a collector node, then the join execution unit 144 would choose a node to execute the join 616 depending on other criteria such the free space on the nodes and the network traffic.

FIG. 11 shows a method 1100 for dynamic distribution of database query joins on a multi-node computing system. The steps in method 1100 are preferably performed by a join execution unit 144 in the service node 140 (FIG. 1) and/or on a node 110 (FIG. 2). First, the join execution unit 144 receives a query join from a database process (step 1110). Next, estimate time needed to execute the query (step 1120). Then get the user controls and database system properties for the join operation (step 1130). Then choose the nodes for the join (step 1140). Next, determine whether collector nodes are used (step 1150). If collector nodes are to be used (step 1150=yes) then setup the collector nodes for processing (step 1160). Then start the query execution (step 1170). After waiting a period of time (step 1180), check if the query execution is done (step 1185). If the query execution is not done (step 1185=no) then make adjustments to the nodes if necessary or needed (step 1190) and return to step 1180 to wait. For example, moving the location of the join may be necessary where a node becomes burdened by network traffic. If the query execution is done (step 1185=yes) then the method is done.

Figure 12:
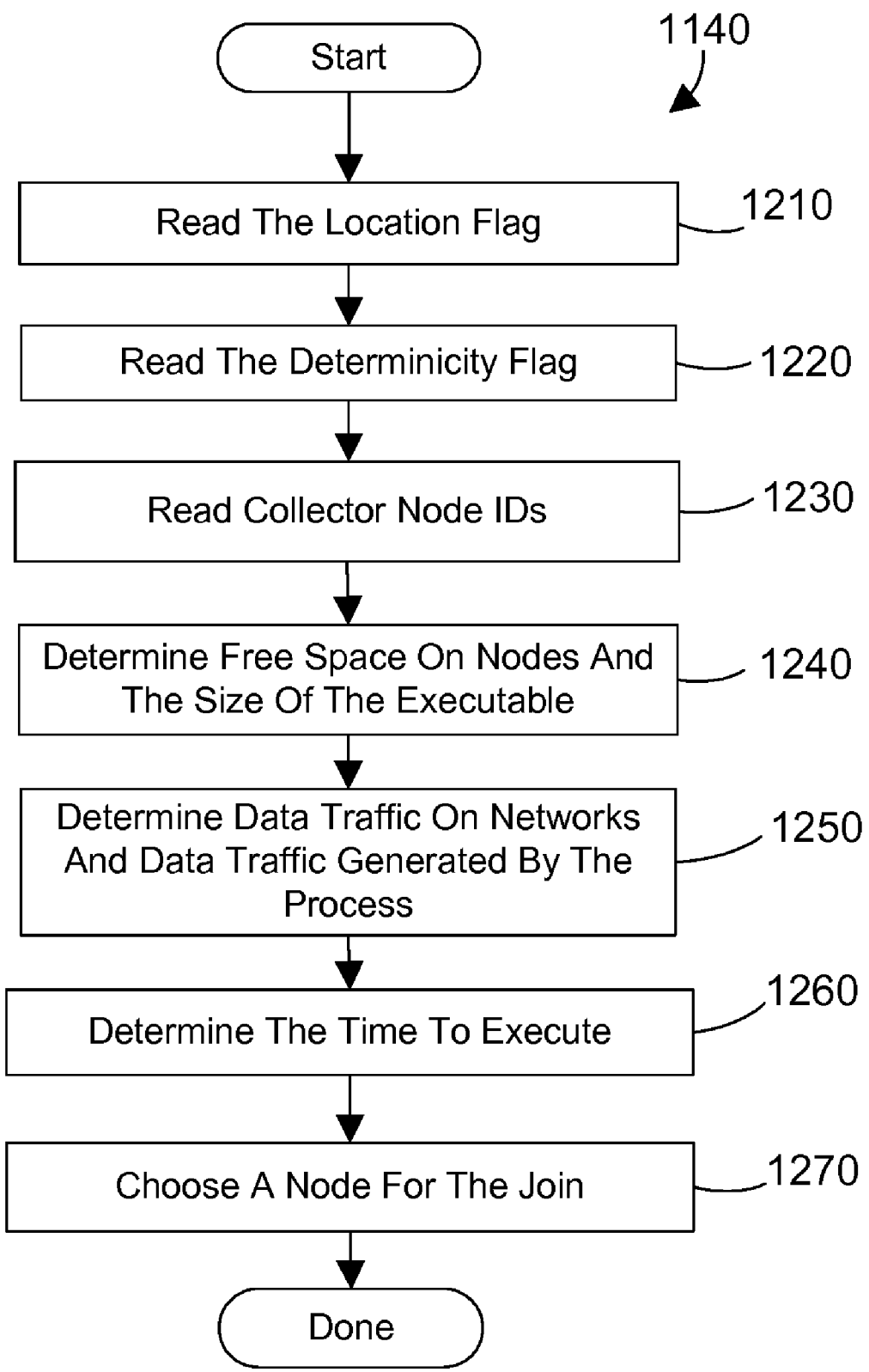
FIG. 12 is a method flow diagram that illustrates one possible implementation of step 1160 in FIG. 11.

FIG. 12 shows a method 1140 that represents one possible implementation for step 1140 in FIG. 11. The method 1140 contains several steps to determine the best location for the join operation. Any combination of the steps could be used and not all the steps shown in FIG. 12 are needed or required. The method first reads the location flag (step 1210) and then the determinicity flag (step 1220). Then it reads whether a collector node is indicated in the user controls collector nodes field (step 1230). Then it determines the free space on the relevant nodes (where the process calling the query join is located, surrounding nodes, I/O nodes, collector nodes, etc.) and the size of the join operation (step 1240). Next, it determines data traffic on the networks for the same nodes as the previous step and the data generated by the join operation (step 1250). Then it determines the estimated time to execute the query (step 1260). A node for the join is then chosen (step 1270). The method is then done.

An apparatus and method is described herein that performs dynamic distribution of database query joins on a multi-node computing system to increase the efficiency of the computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A multi-node computer system comprising:
a plurality of compute nodes that each comprise a processor and memory and are connected by at least one computer network; and
a join execution unit that determines a location for a join operation to execute on the plurality of compute nodes based on user controls in a hints record associated with the database and properties of the database.

2. The multi-node computer system of claim 1 wherein the multi-node computer system is a massively parallel computer system.

3. The multi-node computer system of claim 1 wherein the properties of the database are selected from the following: memory available on the plurality of nodes and the size of the join operation, data traffic on the compute networks, traffic generated by the join operation; and an estimated time to execute the join operation.

4. The multi-node computer system of claim 1 wherein the join execution unit determines the location for the join operation based on one of the following user controls in the hints record:

a location flag set up by a user for the join operation;
a determinicity flag set up by the user for the join operation that signals to execute the join operation on a collector node; and
a collector node field to indicate user preferences for a collector node for executing the join operation.

5. The multi-node computer system of claim 4 further comprising user controls in the hints record stored in the form of a rule to determine the location for the join operation based on a property of the database, where the property of the database includes one of the following: memory available on the plurality of nodes, data traffic on the networks and an estimated time to execute the join operation.

6. The multi-node computer system of claim 4 wherein the collector node is not where the join operation originated.

7. The multi-node computer system of claim 1 wherein the plurality of compute nodes are arranged in a virtual tree network and further comprising an I/O node that connects to the top of the tree network to allow the compute nodes to communicate with a service node of a massively parallel computer system.

8. A computer implemented method for distributing a join operation in a multi-node computer system, the method comprising the steps of:
receiving a query join operation;
getting an estimated time to execute the query;
getting user controls and database properties;
choosing node(s) for the join operation;
where a collector node is to be used, setting up the collector node for processing;
starting query execution; and
while waiting for the query to execute, making node adjustments where needed.

9. The computer implemented method of claim 8 where the step of choosing nodes for the join operation further comprises the steps of:
reading a location flag that indicates where to execute the query;
reading a determinicity flag that indicates the associated data would be more efficiently processed on a collector node rather than a data node; and
reading a collector node field in the user controls that identifies user preferences for selection of the collector node.

10. The computer implemented method of claim 8 where the step of choosing nodes for the join operation further comprises the steps of:
determining memory available on a plurality of nodes and a size of the join operation;
determining data traffic on compute networks and data traffic generated by the join operation; and
determining an estimated time to execute the join operation.

11. The computer implemented method of claim 8 wherein the user controls further comprise rules to determines the location for the join operation based on a property of the database, where a property of the database includes one of the following: memory available on the plurality of nodes, data traffic on the compute networks and an estimated time to execute the join operation.

12. The computer implemented method of claim 8 wherein the plurality of compute nodes are arranged in a virtual tree network and further comprising an I/O node that connects to the top of the tree network to allow the compute nodes to communicate with a service node of a massively parallel computer system.

13. The computer implemented method of claim 12 wherein the virtual tree network is determined by a class routing table.

14. A computer implemented method for distributing a join operation in a multi-node computer system, the method comprising the steps of:
receiving a query join operation;
estimating time to execute the query;
getting user controls and database properties;
where a collector node is to be used, setting up collector nodes for processing;
choosing nodes for the join operation based on data from the following steps:
  a) reading a location flag that indicates where to execute the query;
  b) reading a determinicity flag that indicates the associated data would be more efficiently processed on a collector node rather than a data node;
  c) reading a collector node field in the user controls indicating user preferences for the collector node for executing the join operation;
  d) determining memory available on a plurality of nodes and a size of the join operation;
  e) determining data traffic on compute networks and data traffic generated by the join operation;
  f) determining an estimated time to execute the join operation;
starting query execution in the nodes chosen;
while waiting for the query to execute, making node adjustments where needed; and
wherein the user controls further comprise rules to determines the location for the join operation based on a property of the database, where a property of the database includes one of the following: memory available on the plurality of nodes, data traffic on the compute networks and an estimated time to execute the join operation.

15. A computer-readable article of manufacture comprising:
a join execution unit that determines a location for a join operation of a database to execute on a plurality of compute nodes based on user controls in a hints record associated with the database and properties of the database; and
tangible computer recordable media bearing the join execution unit.

16. The article of manufacture of claim 15 wherein the properties of the database are selected from the following: memory available on the plurality of nodes and the size of the join operation, data traffic on the compute networks, traffic generated by the join operation; an estimated time to execute the join operation and nodes with code optimizations.

17. The article of manufacture of claim 15 wherein the join execution unit on one of the following user controls in the hints record:
a location flag set up by a user for the join operation;
a determinicity flag set up by the user for the join operation that signals to execute the join operation on a collector node; and
a collector node field to indicate user preferences for a collector node for executing the join operation.

18. The article of manufacture of claim 17 wherein further comprising user controls in a hints record stored in the form of a rule to determines the location for the join operation based on a property of the database, where a property of the database includes one of the following: memory available on the plurality of nodes, data traffic on the compute networks and an estimated time to execute the join operation.

19. The article of manufacture of claim 18 wherein the plurality of compute nodes are arranged in a virtual tree network and further comprising an I/O node that connects to the top of the tree network to allow the compute nodes to communicate with a service node of a massively parallel computer system and wherein the virtual tree network is determined by a class routing table.

20. The article of manufacture of claim 15 wherein the collector node is not where the join operation originated.

* * * * *